(12) United States Patent
Black

(10) Patent No.: US 12,335,157 B2
(45) Date of Patent: Jun. 17, 2025

(54) RATE LIMITER STATE CACHING

(71) Applicant: Dropbox, Inc., San Francisco, CA (US)

(72) Inventor: Raven Black, Naples, FL (US)

(73) Assignee: Dropbox, Inc., San Francisco, CA (US)

( * ) Notice: Subject to any disclaimer, the term of this patent is extended or adjusted under 35 U.S.C. 154(b) by 226 days.

(21) Appl. No.: 18/108,536

(22) Filed: Feb. 10, 2023

(65) Prior Publication Data

US 2024/0275730 A1    Aug. 15, 2024

(51) Int. Cl.
| | | |
|---|---|---|
| *H04L 47/25* | (2022.01) | |
| *H04L 47/20* | (2022.01) | |
| *H04L 47/263* | (2022.01) | |

(52) U.S. Cl.
CPC .............. *H04L 47/25* (2013.01); *H04L 47/20* (2013.01); *H04L 47/263* (2013.01)

(58) Field of Classification Search
CPC ........ H04L 47/25; H04L 47/20; H04L 47/263
See application file for complete search history.

(56) References Cited

U.S. PATENT DOCUMENTS

| | | | | |
|---|---|---|---|---|
| 8,681,630 | B1* | 3/2014 | Gibson ................... | H04L 67/62 370/235 |
| 9,654,483 | B1* | 5/2017 | Benson ............... | H04L 63/1466 |
| 10,084,726 | B2* | 9/2018 | Zhang ..................... | H04L 49/25 |
| 11,483,246 | B2* | 10/2022 | Wang ...................... | H04L 47/24 |
| 2002/0110084 | A1 | 8/2002 | Butt et al. | |
| 2013/0003554 | A1* | 1/2013 | Aybay .................... | H04L 47/10 370/235 |
| 2014/0025772 | A1 | 1/2014 | Szeto et al. | |
| 2014/0173130 | A1* | 6/2014 | Uluderya ............... | G06F 9/5044 709/238 |
| 2014/0301388 | A1* | 10/2014 | Jagadish ............... | H04L 67/563 370/389 |
| 2015/0074285 | A1 | 3/2015 | Gahm et al. | |
| 2016/0212060 | A1* | 7/2016 | Holcombe .............. | H04L 67/60 |
| 2016/0226763 | A1* | 8/2016 | Zhang ................. | H04L 49/3009 |
| 2017/0289053 | A1* | 10/2017 | Byelov ................... | H04L 47/25 |
| 2018/0013852 | A1 | 1/2018 | Erickson | |
| 2018/0248807 | A1* | 8/2018 | Murphy .................. | H04L 67/53 |
| 2019/0222519 | A1* | 7/2019 | Mentze ................... | H04L 47/20 |

(Continued)

FOREIGN PATENT DOCUMENTS

WO     2008112770 A2     9/2008

OTHER PUBLICATIONS

Radhakrishnan S., et al., "SENIC: Scalable NIC for End-Host Rate Limiting," 11th USENIX Symposium on Networked Systems Design and Implementation, Apr. 2-4, 2014, 15 pages.

*Primary Examiner* — David R Lazaro
*Assistant Examiner* — Robert A Shaw
(74) *Attorney, Agent, or Firm* — Polsinelli PC

(57) ABSTRACT

Reduction in or avoidance of latency in a rate limiting process is achieved by the implementation of a cache, on a rate limiting client, storing a current state of a rate liming server. The rate limiting client receives a communication from a source device that is destined to a destination device. The rate limiting client determines the state of rate limiting. If the state of rate limiting indicates that rate limiting is not in place on the rate limiting server, the rate limiting client transmits the communication to the destination device without waiting for a response from the rate limiting server. The rate limiting client queries the rate limiting server as to whether to update the state.

20 Claims, 13 Drawing Sheets

(56) References Cited

U.S. PATENT DOCUMENTS

| | | |
|---|---|---|
| 2019/0268442 A1* | 8/2019 | Puniani .................. H04L 67/10 |
| 2020/0028788 A1 | 1/2020 | Chen et al. |
| 2020/0220848 A1* | 7/2020 | Patwardhan ........ H04L 41/5041 |
| 2020/0220949 A1* | 7/2020 | Puniani .................. H04L 67/01 |
| 2021/0105317 A1* | 4/2021 | Kona .................. H04L 43/0876 |
| 2021/0218677 A1* | 7/2021 | Wang ...................... H04L 47/24 |
| 2021/0306217 A1* | 9/2021 | Paiva .................... H04L 67/289 |
| 2022/0070102 A1* | 3/2022 | Wang .................... H04L 69/326 |
| 2023/0034770 A1* | 2/2023 | Srebrnik ............... G06F 9/4881 |
| 2023/0093304 A1* | 3/2023 | Brasburg ................ G06F 9/541 |
| | | 717/120 |

* cited by examiner

Draft Speech

Here is the draft of the speech. @Bill_Seward, @John Hay, please comment.

"Four score and seven years ago our fathers brought forth, upon this continent, a new nation, conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate – we can not consecrate – we can not hallow, this ground – The brave men, living and dead, who struggled here, have hallowed it, far above our poor power to add or detract. The world will little note, nor long remember what we say here; while it can never forget what they did here.

---

Share

Comments (6)

New Comment...

Edward Everett    12/15/10 at 11:05 pm
You say in two minutes what would take me two hours. Well done.

Bill Seward    12/15/10 at 11:10 pm
Certainly the bloodiest...
------- 2 more comments -------

John Hay    12/15/10 at 11:1pm
What happened to "It is altogether fitting and proper that we should do this." ???

Reply

George Bancroft    12/15/10 at 11:05 pm
I would like to use this in fundraising for soliders.
@Bill_Seward your thoughts?

Reply

*FIG. 5A*

Draft Speech 531

Here is the draft of the speech. @Bill_Seward, @John Hay, please comment.

"Four score and seven years ago our fathers brought forth, upon this continent, a new nation, conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate – we can not consecrate – we can not hallow, this ground – The brave men, living and dead, who struggled here, have hallowed it, far above our poor power to add or detract. The world will little note, nor long remember what we say here; while it can never forget what they did here.

---

Share

Comments (7)

New Comment...

John Nicolay   12/16/10 at 8:25 am
I like this version better than the first draft @file Reply Edward Everett   12/15/10 at 11:05 pm
You say in two minutes what would take me two hours. Well done.

Bill Seward   12/15/10 at 11:10 pm
Certainly the bloodiest...
— 2 more comments —

John Hay   12/15/10 at 11:1pm
What happened to "It is altogether fitting and proper that we should do this." ???

Reply

George Bancroft   12/15/10 at 11:05 pm
I would like to use this in fundraising for soliders.
@Bill_Seward your thoughts?

Reply

*FIG. 5B*

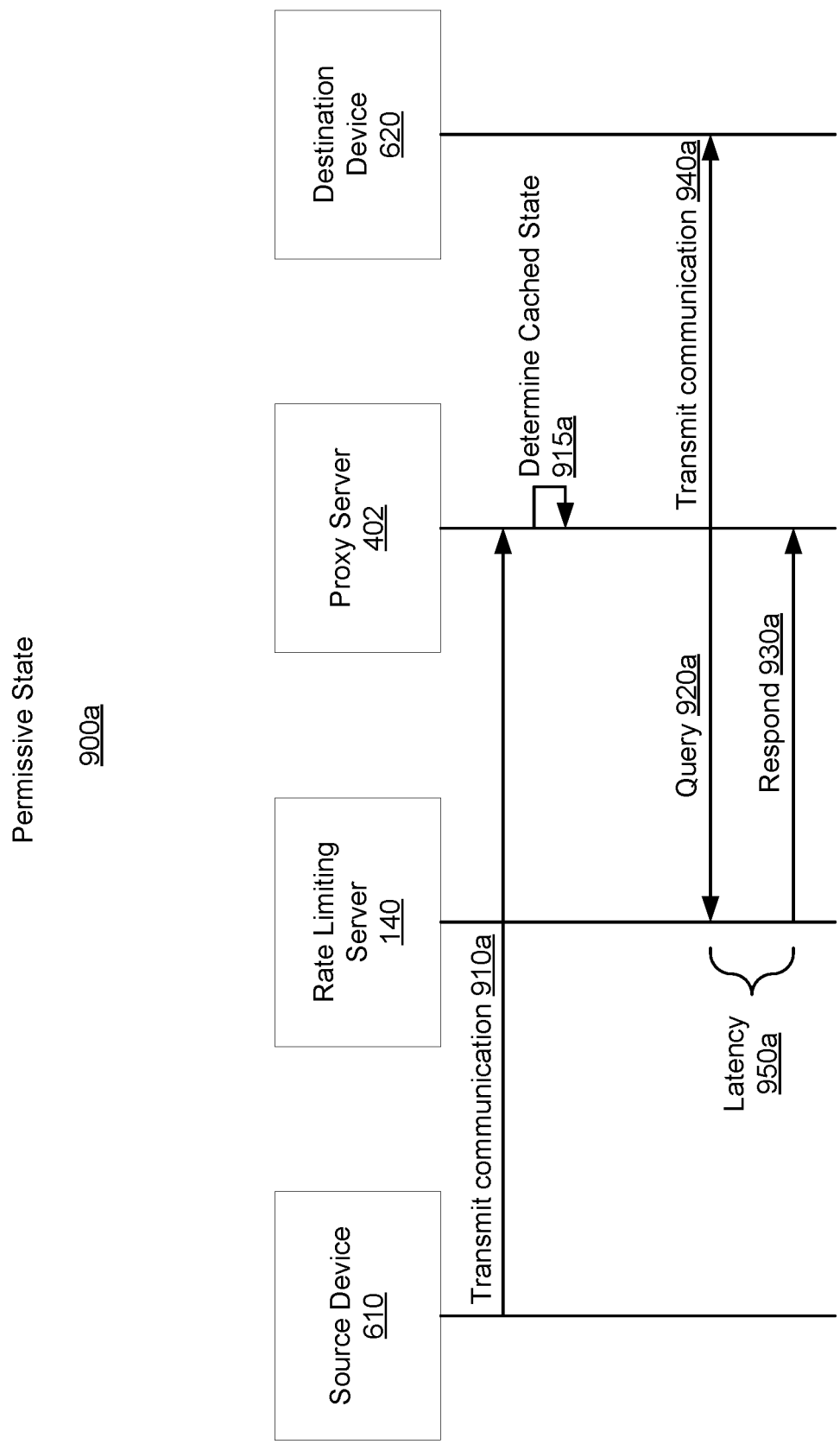

RATE LIMITER STATE CACHING

TECHNICAL FIELD

The disclosed embodiments generally relate to database management.

BACKGROUND

Rate limiting may be employed to limit the number of requests sent or received in a network for a given time frame. Rate limiting may reduce strain on the network or prevent malicious attacks by dropping communications when they are received at too high a rate. Rate limiting may be performed by a rate limiting server that measures the amount of time elapsed between each request. If too many requests are received in a given time period, the rate limiting server will direct its client to not fulfill some of the requests. Though rate limiting is an effective strategy for limiting strain on a network, it also adds latency, as all requests are required to wait for a response from the rate limiting server before either being fulfilled or unfulfilled.

SUMMARY

Reduction in or avoidance of latency in the rate limiting process is achieved by the implementation of a cache in one or more rate limiting clients that locally tracks a state of rate limiting. The cache stores one or more keys that each track a state of rate limiting for a given path. The cache may store whether the state of rate limiting for a given path is permissive or strict for an increment of time. While the rate limiting server may be pinged by the rate limiting client each time a request is received, when the state of rate limiting is permissive, the rate limiting client pushes the request through to the destination without waiting for a response from the rate limiting server. This, in the aggregate, improves network utilization and scalability by allowing traffic to pass through the network when the network has bandwidth to take the traffic without introducing latency into the process.

In one or more embodiments, the rate limiting client receives a communication from a source device that is destined to a destination device. In response to receiving the communication, the rate limiting client determines the state of rate limiting. Responsive to determining that the state of rate limiting is permissive, the rate limiting client transmits the communication to the destination device. The rate limiting client transmits a query to the rate limiting server, asking whether to update the state of rate limiting.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIG. 5A shows an example user interface of a collaborative content item page including various comments.

FIG. 5B shows an example user interface with a file-level comment associated with the title of the collaborative content item.

FIG. 9A shows an interaction diagram between a source device, rate limiting server, proxy server, and destination device when the state is permissive, according to one example embodiment.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

System Overview

Figure 1:
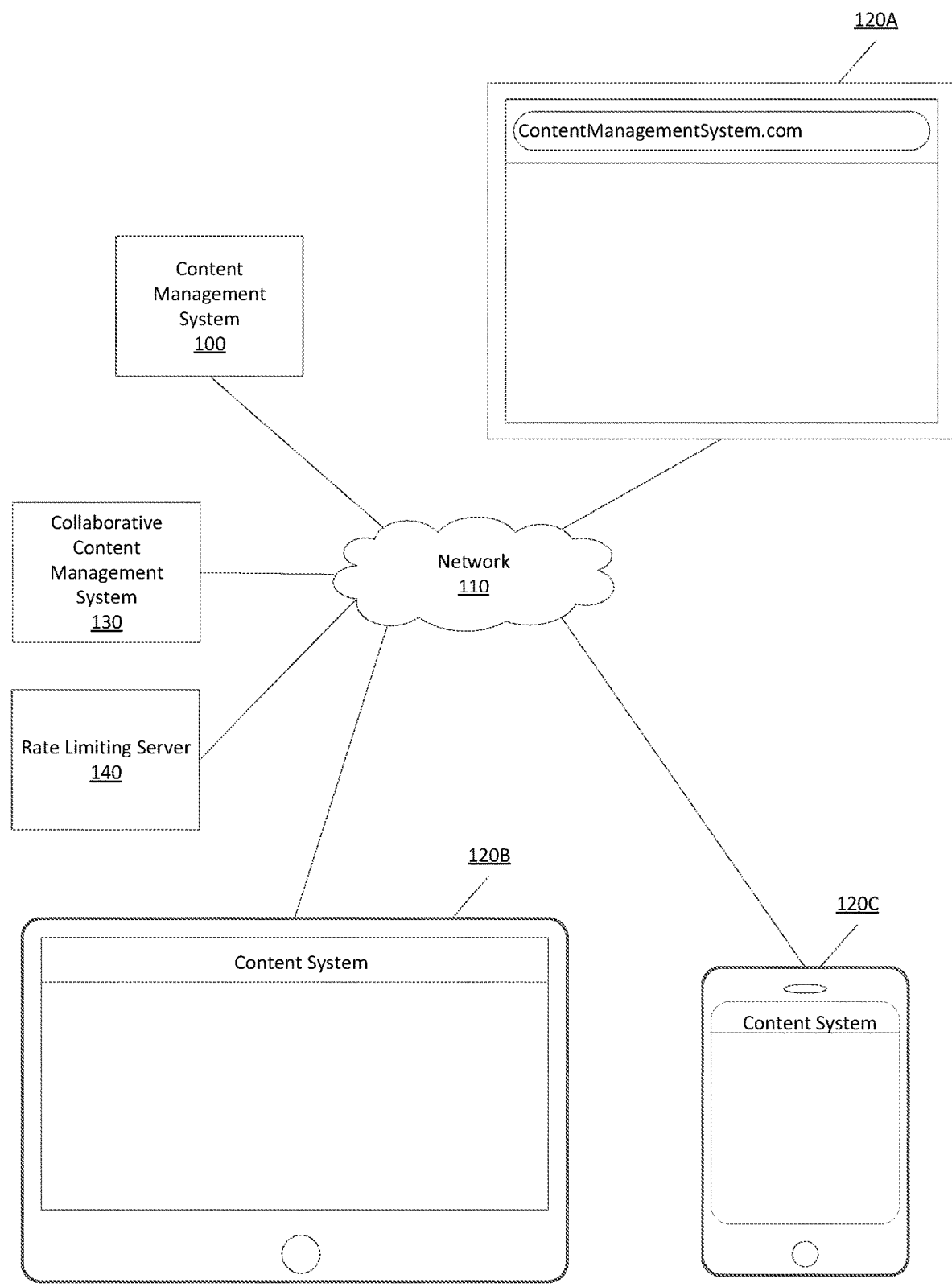
FIG. 1 shows a diagram of a system environment of a content management system and a collaborative content management system according to one embodiment.

FIG. 1 shows a system environment including content management system 100, collaborative content management system 130, client devices 120a, 120b, and 120c (collectively or individually "120"), and rate limiting server 140. Content management system 100 provides functionality for sharing content items with one or more client devices 120 and synchronizing content items between content management system 100 and one or more client devices 120.

The content stored by content management system 100 can include any type of content items, such as documents, spreadsheets, collaborative content items, text files, audio files, image files, video files, webpages, executable files, binary files, placeholder files that reference other content items, etc. In some implementations, a content item can be a portion of another content item, such as an image that is included in a document. Content items can also include collections, such as folders, namespaces, playlists, albums, etc., that group other content items together. The content stored by content management system 100 may be organized in one configuration in folders, tables, or in other database structures (e.g., object oriented, key/value etc.).

In one embodiment, the content stored by content management system 100 includes content items created by using third party applications, e.g., word processors, video and image editors, database management systems, spreadsheet applications, code editors, and so forth, which are independent of content management system 100.

In some embodiments, content stored by content management system 100 includes content items, e.g., collaborative content items, created using a collaborative interface provided by collaborative content management system 130. In various implementations, collaborative content items can be stored by collaborative content item management system 130, with content management system 100, or external to content management system 100. A collaborative interface can provide an interactive content item collaborative platform whereby multiple users can simultaneously create and edit collaborative content items, comment in the collaborative content items, and manage tasks within the collaborative content items.

Users may create accounts at content management system 100 and store content thereon by sending such content from client device 120 to content management system 100. The content can be provided by users and associated with user accounts that may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 120 communicate with content management system 100 and collaborative content management system 130 through network 110. The network may be any suitable communications network for data transmission. In one embodiment, network 110 is the Internet and uses standard communications technologies and/or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

In some embodiments, content management system 100 and collaborative content management system 130 are combined into a single system. The system may include one or more servers configured to provide the functionality discussed herein for the systems 100 and 130.

Figure 8:
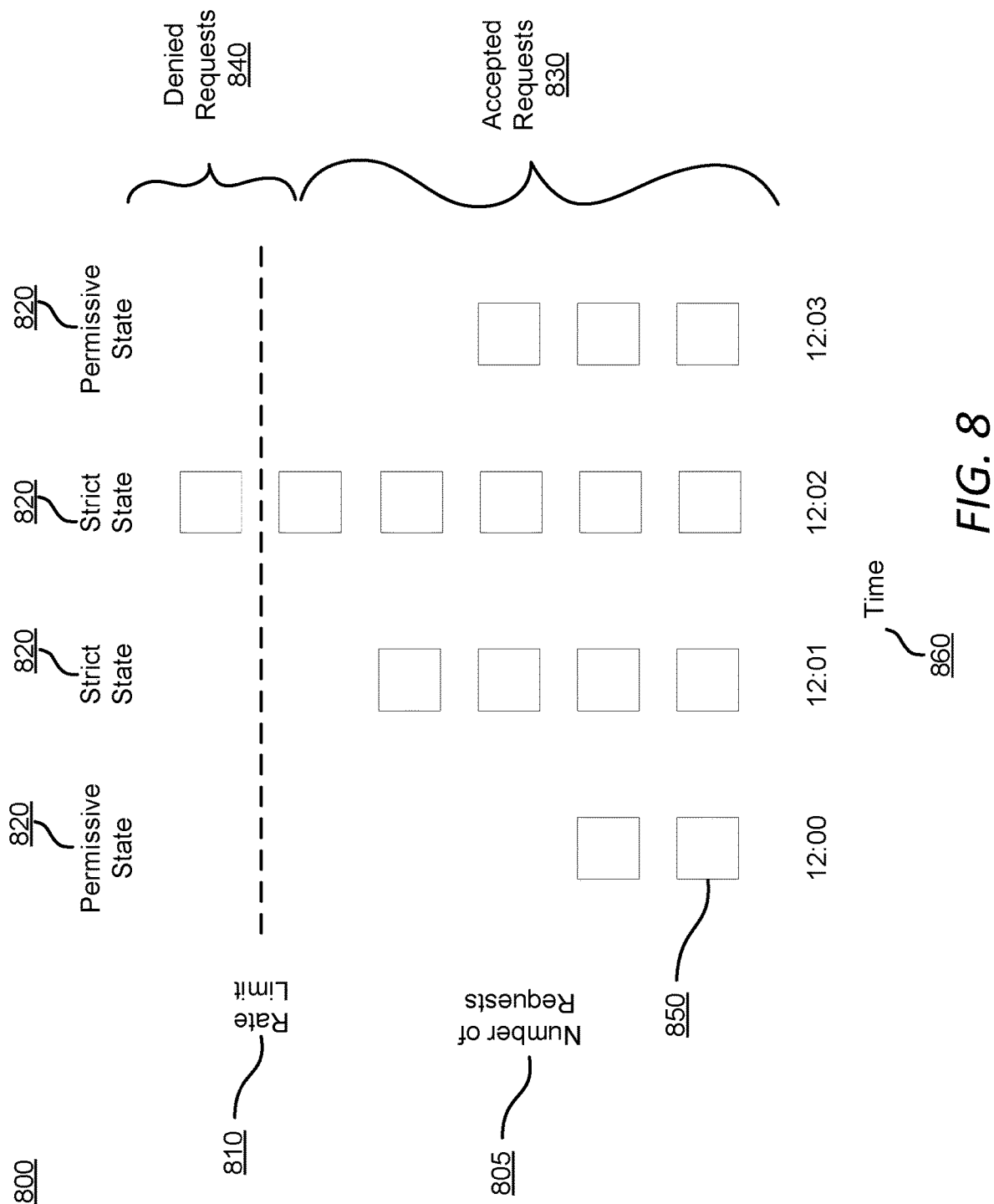
FIG. 8 shows a state of rate limiting for various example rate limiting scenarios, according to one example embodiment.

Rate limiting server 140 limits the number of requests sent or received in the network 110 within a given time frame, for a given path, on behalf of a rate limiting client, which may be referred to herein as a "proxy server". The path may include information on the source and destination of the communication, such as the source server, source IP, destination server, or destination IP. The path may include information on the route of the communication, such as the number of nodes (i.e., intermediate servers in the communication's path), the type of protocol used in the communication, or the network used in the communication. The path may include information on the communication itself, such as the communication domain, the size of the communication, or other attributes of the communication. For a given path, rate limiting server 140 may measure the amount of time elapsed between each request and, responsive to receiving too many requests in a given time frame (i.e., a rate limit for the path is surpassed), rate limiting server 140 may direct its client to not fulfill some of the requests. Rate limiting may exist in various states. For example, when rate limiting server 140 receives requests at a rate lower than the rate limit (e.g., for a given path), rate limiting server 140 is able to direct its client to fulfill all requests and does not have the process of rate limiting in place. In this case, the state of rate limiting may be thought of as "permissive." In another example, when rate limiting server 140 receives requests at a rate higher than the rate limit (e.g., for a given path) and is not able to fulfill all requests, rate limiting server 140 has the process of rate limiting in place to prevent strain on network 110. In this case, the state of rate limiting may be thought of as "strict." Rate limiting may exist in a state where the rate is below the rate limit yet close to the rate limit or is approaching the rate limit as time passes. This state may also be thought of as "strict." Rate limiting server 140 may determine that the rate is approaching the rate limit using any predefined heuristic or rule, such as applying a threshold rate (e.g., relative to the rate limit) or a threshold change in the rate over time (e.g., the derivative of the rate over time). Examples of situations involving each state are illustrated in FIG. 8.

Client Device

Figure 2:
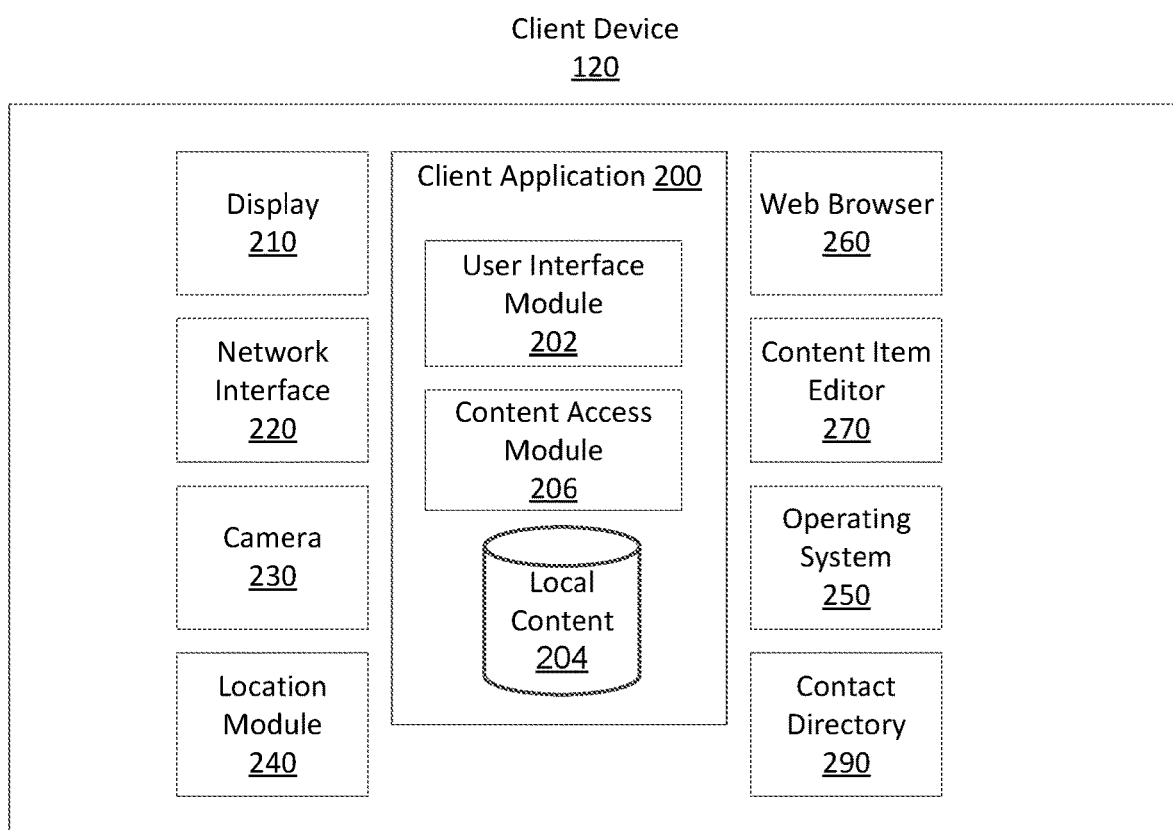
FIG. 2 shows a block diagram of components of a client device, according to one example embodiment.

FIG. 2 shows a block diagram of the components of a client device 120 according to one embodiment. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. There are additional components that may be included in client device 120 but that are not shown, for example, one or more computer processors, local fixed memory (RAM and ROM), as well as optionally removable memory (e.g., SD-card), power sources, and audio-video outputs.

In certain embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Client devices 120 maintain various types of components and modules for operating the client device and accessing content management system 100. The software modules can include operating system 250 or a collaborative content item editor 270. Collaborative content item editor 270 is configured for creating, viewing and modifying collaborative content items such as text documents, code files, mixed media files (e.g., text and graphics), presentations or the like. Operating system 250 on each device provides a local file management system and executes the various software modules such as content management system client application 200 and collaborative content item editor 270. A contact directory 290 stores information on the user's contacts, such as name, telephone numbers, company, email addresses, physical address, website URLs, and the like.

Client devices 120 access content management system 100 and collaborative content management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at the content management system is represented at the client device 120 as a local file structure by operating system 250 in conjunction with client application 200.

Client application 200 manages access to content management system 100 and collaborative content management system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as collaborative content item editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

Content Management System

Figure 3:
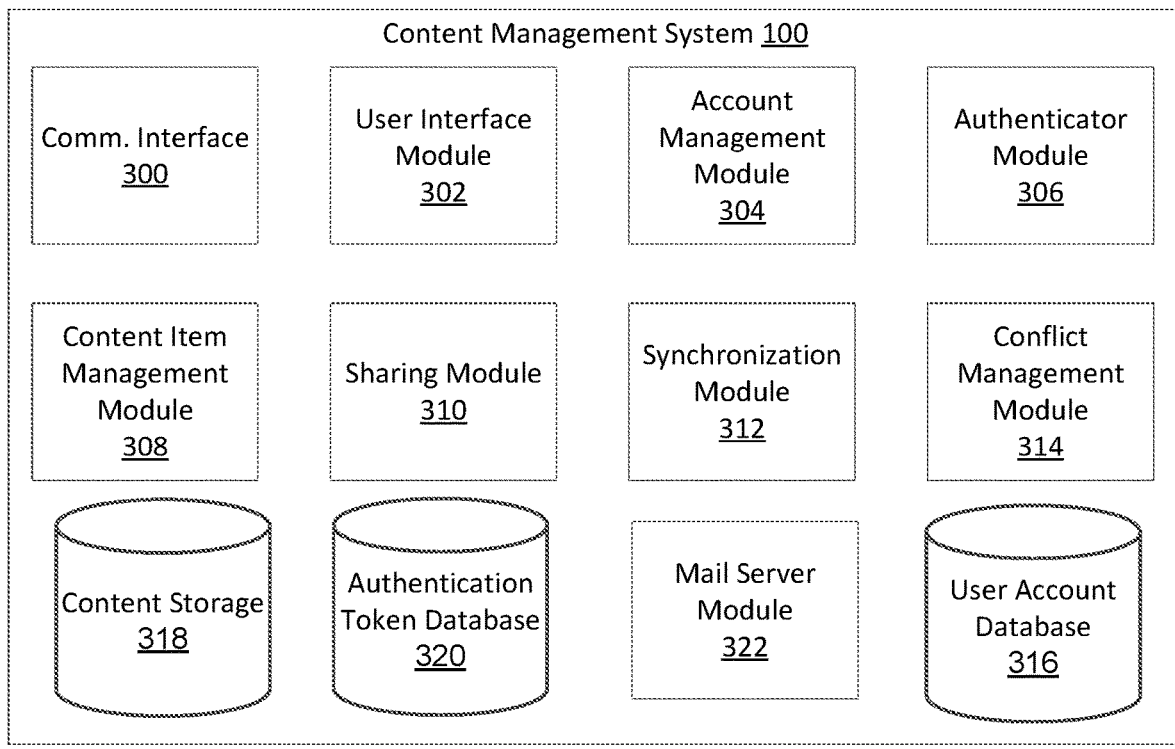
FIG. 3 shows a block diagram of a content management system, according to one example embodiment.

FIG. 3 shows a block diagram of the content management system 100 according to one embodiment. To facilitate the various content management services, a user can create an account with content management system 100. The account information can be maintained in user account database 316, and is one means for performing this function. User account database 316 can store profile information for registered users. In some cases, the only personal information in the user profile is a username and/or email address. However, content management system 100 can also be configured to accept additional user information, such as password recovery information, demographics information, payment information, and other details. Each user is associated with a userID and a user name. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on derivative identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content items, such as collaborative content items, audio files, video files, etc., from one or more client devices associated with the account. Content items can be shared with multiple users and/or user accounts. In some implementations, sharing a content item can include associating, using sharing module 310, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on: a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some implementations, shared content items can be accessible to a recipient user without requiring authentication into a user account. This can include sharing module 310 providing access to a content item through activation of a link associated with the content item or providing access through a globally accessible shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 can store a single copy and then use a pointer or other mechanism to link the duplicates to the single copy. Similarly, content storage 318 stores files using a file version control mechanism that tracks changes to files, different versions of files (such as a diverging version tree), and a change history. The change history can include a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

In some embodiments, content management system 100 includes a content management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

In some embodiments, the content management system 100 can include a mail server module 322. The mail server module 322 can send (and receive) collaborative content items to (and from) other client devices using the collaborative content management system 100. The mail server module can also be used to send and receive messages between users in the content management system.

Collaborative Content Management System

Figure 4:
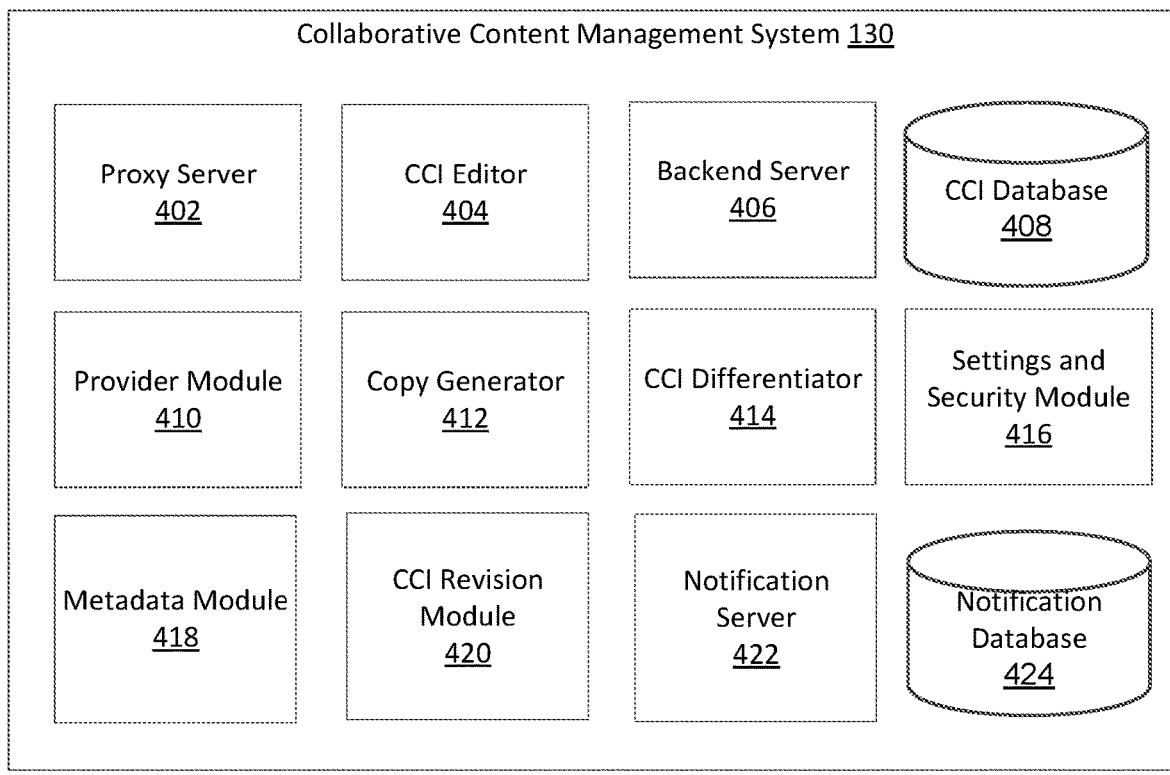
FIG. 4 shows a block diagram of a collaborative content management system, according to one example embodiment.

FIG. 4 shows a block diagram of the collaborative content management system 130, according to one embodiment. Collaborative content items can be files that users can create and edit using a collaborative content items editor 270 and can contain collaborative content item elements. Collaborative content item elements may include any type of content such as text; images, animations, videos, audio, or other multi-media; tables; lists; references to external content;

programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 120, using sharing 310 and synchronization 312 modules of content management system 100. Users operate client devices 120 to create and edit collaborative content items, and to share collaborative content items with other users of client devices 120. Changes to a collaborative content item by one client device 120 are propagated to other client devices 120 of users associated with that collaborative content item.

In the embodiment of FIG. 1, collaborative content management system 130 is shown as separate from content management system 100 and can communicate with it to obtain its services. In other embodiments, collaborative content management system 130 is a subsystem of the component of content management system 100 that provides sharing and collaborative services for various types of content items. User account database 316 and authentication token database 320 from content management system 100 are used for accessing collaborative content management system 130 described herein.

Collaborative content management system 130 can include various servers for managing access and edits to collaborative content items and for managing notifications about certain changes made to collaborative content items. Collaborative content management system 130 can include proxy server 402, collaborative content item editor 404, backend server 406, and collaborative content item database 408, access link module 410, copy generator 412, collaborative content item differentiator 414, settings module 416, metadata module 418, revision module 420, notification server 422, and notification database 424. Proxy server 402 handles requests from client applications 200 and passes those requests to the collaborative content item editor 404. Proxy server 402 includes a cache, which may contain multiple cache keys. Collaborative content item editor 404 manages application level requests for client applications 200 for editing and creating collaborative content items, and selectively interacts with backend servers 406 for processing lower level processing tasks on collaborative content items, and interfacing with collaborative content items database 408 as needed. Collaborative content items database 408 contains a plurality of database objects representing collaborative content items, comment threads, and comments. Each of the database objects can be associated with a content pointer indicating the location of each object within the CCI database 408. Notification server 422 detects actions performed on collaborative content items that trigger notifications, creates notifications in notification database 424, and sends notifications to client devices.

Client application 200 sends a request relating to a collaborative content item to proxy server 402. Generally, a request indicates the userID ("UID") of the user, and the collaborativeContentItemID ("NID") of the collaborative content item, and additional contextual information as appropriate, such as the text of the collaborative content item. When proxy server 402 receives the request, the proxy server 402 passes the request to the collaborative content item editor 404. Proxy server 402 also returns a reference to the identified collaborative content items proxy server 402 to client application 200, so the client application can directly communicate with the collaborative content item editor 404 for future requests. In an alternative embodiment, client application 200 initially communicates directly with a specific collaborative content item editor 404 assigned to the userID.

When collaborative content item editor 404 receives a request, it determines whether the request can be executed directly or by a backend server 406. When the request adds, edits, or otherwise modifies a collaborative content item the request is handled by the collaborative content item editor 404. If the request is directed to a database or index inquiry, the request is executed by a backend server 406. For example, a request from client device 120 to view a collaborative content item or obtain a list of collaborative content items responsive to a search term is processed by backend server 406.

The access module 410 receives a request to provide a collaborative content item to a client device. In one embodiment, the access module generates an access link to the collaborative content item, for instance in response to a request to share the collaborative content item by an author. The access link can be a hyperlink including or associated with the identification information of the CCI (i.e., unique identifier, content pointer, etc.). The hyperlink can also include any type of relevant metadata within the content management system (i.e., author, recipient, time created, etc.). In one embodiment, the access module can also provide the access link to user accounts via the network 110, while in other embodiments the access link can be provided or made accessible to a user account and is accessed through a user account via the client device. In one embodiment, the access link will be a hyperlink to a landing page (e.g., a webpage, a digital store front, an application login, etc.) and activating the hyperlink opens the landing page on a client device. The landing page can allow client devices not associated with a user account to create a user account and access the collaborative content item using the identification information associated with the access link. Additionally, the access link module can insert metadata into the collaborative content item, associate metadata with the collaborative content item, or access metadata associated with the collaborative content item that is requested.

The access module 410 can also provide collaborative content items via other methods. For example, the access module 410 can directly send a collaborative content item to a client device or user account, store a collaborative content item in a database accessible to the client device, interact with any module of the collaborative content management system to provide modified versions of collaborative content items (e.g., the copy generator 412, the CCI differentiator 414, etc.), sending content pointer associated with the collaborative content item, sending metadata associated with the collaborative content item, or any other method of providing collaborative content items between devices in the network. The access module can also provide collaborative content items via a search of the collaborative content item database (i.e., search by a keyword associated with the collaborative content item, the title, or a metadata tag, etc.).

The copy generator 412 can duplicate a collaborative content item. Generally, the copy generator duplicates a collaborative content item when a client device selects an access link associated with the collaborative content item. The copy generator 412 accesses the collaborative content item associated with the access link and creates a derivative copy of the collaborative content item for every request received. The copy generator 412 stores each derivative copy of the collaborative content item in the collaborative content item database 408. Generally, each copy of the collaborative content item that is generated by the copy generator 412 is associated with both the client device from which the request was received and the user account associated with the client device requesting the copy. When the copy of the collaborative content item is generated it can create a new unique identifier and content pointer for the copy of the collaborative content item. Additionally, the copy generator 412 can insert metadata into the collaborative content item, associate metadata with the copied collaborative content item, or access metadata associated with the collaborative content item that was requested to be copied.

The collaborative content item differentiator 414 determines the difference between two collaborative content items. In one embodiment, the collaborative content item differentiator 414 determines the difference between two collaborative content items when a client device selects an access hyperlink and accesses a collaborative content item that the client device has previously used the copy generator 412 to create a derivative copy. The content item differentiator can indicate the differences between the content elements of the compared collaborative content items. The collaborative content item differentiator 414 can create a collaborative content item that includes the differences between the two collaborative content items, i.e., a differential collaborative content item. In some embodiments, the collaborative content item differentiator provides the differential collaborative content item to a requesting client device 120. The differentiator 414 can store the differential collaborative content item in the collaborative content item database 408 and generate identification information for the differential collaborative content item. Additionally, the differentiator 414 can insert metadata into the accessed and created collaborative content items, associate metadata with the accessed and created collaborative content item, or access metadata associated with the collaborative content items that were requested to be differentiated.

The settings and security module 416 can manage security during interactions between client devices 120, the content management system 100, and the collaborative content management system 130. Additionally, the settings and security module 416 can manage security during interactions between modules of the collaborative content management system. For example, when a client device 120 attempts to interact within any module of the collaborative content management system 100, the settings and security module 416 can manage the interaction by limiting or disallowing the interaction. Similarly, the settings and security module 416 can limit or disallow interactions between modules of the collaborative content management system 130. Generally, the settings and security module 416 accesses metadata associated with the modules, systems 100 and 130, devices 120, user accounts, and collaborative content items to determine the security actions to take. Security actions can include: requiring authentication of client devices 120 and user accounts, requiring passwords for content items, removing metadata from collaborative content items, preventing collaborative content items from being edited, revised, saved or copied, or any other security similar security action. Additionally, settings and security module can access, add, edit or delete any type of metadata associated with any element of content management system 100, collaborative content management system 130, client devices 120, or collaborative content items.

The metadata module 418 manages metadata within with the collaborative content management system. Generally, metadata can take three forms within the collaborative content management system: internal metadata, external metadata, and device metadata. Internal metadata is metadata within a collaborative content item, external metadata is metadata associated with a CCI but not included or stored within the CCI itself, and device metadata is associated with client devices. At any point the metadata module can manage metadata by changing, adding, or removing metadata.

Some examples of internal metadata can be: identifying information within collaborative content items (e.g., email addresses, names, addresses, phone numbers, social security numbers, account or credit card numbers, etc.); metadata associated with content elements (e.g., location, time created, content element type; content element size; content element duration, etc.); comments associated with content elements (e.g., a comment giving the definition of a word in a collaborative content item and its attribution to the user account that made the comment); or any other metadata that can be contained within a collaborative content item.

Some examples of external metadata can be: content tags indicating categories for the metadata; user accounts associated with a CCI (e.g., author user account, editing user account, accessing user account etc.); historical information (e.g., previous versions, access times, edit times, author times, etc.); security settings; identifying information (e.g., unique identifier, content pointer); collaborative content management system 130 settings; user account settings; or any other metadata that can be associated with the collaborative content item.

Some examples of device metadata can be: device type; device connectivity; device size; device functionality; device sound and display settings; device location; user accounts associated with the device; device security settings; or any other type of metadata that can be associated with a client device 120.

The collaborative content item revision module 420 manages application level requests for client applications 200 for revising differential collaborative content items and selectively interacts with backend servers 406 for processing lower level processing tasks on collaborative content items, and interfacing with collaborative content items database 408 as needed. The revision module can create a revised collaborative content item that is some combination of the content elements from the differential collaborative content item. The revision module 420 can store the revised collaborative content item in the collaborative content item database or provide the revised collaborative content item to a client device 120. Additionally, the revision module 420 can insert metadata into the accessed and created collaborative content items, associate metadata with the accessed and created collaborative content item, or access metadata associated with the collaborative content items that were requested to be differentiated.

Content management system 100 and collaborative content management system 130 may be implemented using a single computer, or a network of computers, including cloud-based computer implementations. The operations of content management system 100 and collaborative content management system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system. Finally, the functions and operations of content management system 100 and collaborative content management system 130 are sufficiently complex as to require implementation on a computer system and cannot be performed in the human mind simply by mental steps.

Comment Management User Interface

Referring now to FIG. 5A, there is shown an example user interface with page of a collaborative content item 502 entitled "Draft Speech" in which several comments 504 associated with the collaborative content item have been made. In this example, a collaborative content item 502 is composed of content such as lines of text, which can be arranged such as in paragraph blocks 508, and may include any other form of media, such as images, videos, spreadsheets, executable or interpretable code, and so forth.

Content Level Comments

A collaborative content item 502 can have zero or more content level comments 504. Content level comments can be associated with specific portions of a collaborative content item. The presence of content level comments 504 within the content item may be indicated by underlined (or colored underlined) portions 510 of content, though any other formatting may be used to indicate the presence of a content level comment 504 (e.g., lines connecting the content level comments to the content item, comment numbers in superscript form, highlighting, a "hover over" display indicator etc.). The portion 510 of content with which a content level comment is associated is also called a span. Content level comments 504 can be associated with overlapping spans; the first and second content level comments 504a, 504b are applied to the span "Now we are engaged in a great civil war, testing whether that nation, or any nation so conceived, and so dedicated, can long endure" and the third comment 504c is associated with just the span "This we may, in all propriety do."

The content level comments 504 can be arranged in a comment pane 512 positioned to the side of the body of the collaborative content item 502. Each content level comment 504 has an author 514 (indicated by user name) and a creation date and time. A collection of comments that together form an exchange between users with respect to a single span is a thread 518. Threads are displayed proximate the span that is associated with the thread. In the example of FIG. 5A, there are three threads, 518a, 518b, and 518c; thread 518a has a total of four comments (two shown, and "2 more comments" as indicated) and the other threads have one comment each.

A user may create a new comment or reply to existing comment. To create a comment, a user selects a span in the content item, and activates a comment function, for example via button 522, menu or other input. The new comment 504 is displayed in the comment pane 512, indicating the user name and creation time, and the user may then enter text for the comment therein. The user can apply text formatting to the text of the comment as done for formatting the text of the collaborative content item. A user may also create a comment to include in a thread by entering text into a reply field 516 in one of the comments 504, such as the most recent comment in a thread 518.

When a user opens a collaborative content item initially, the comment pane 512 can be closed such that the comments therein are hidden. The user can activate the comment pane 512 to show the content level comments by selecting text (e.g., double clicking) text that is formatted or otherwise indicated as having an associated comment. In some implementations, the comment pane 512 can be visible when a collaborative content item is opened. The pane 512 includes a counter 524 of the current number of content level comments in the collaborative content item that are visible to the user. Each comment can have a state, as to whether the comment is active or resolved. The counter 524 serves as a menu that the user can select from to filter the comments so as to show all comments, active comments or resolved comments.

A collaborative content item may also include a share icon 526 that allows a user to share the collaborative content item with other users of the content management system 100. Upon clicking on the share icon 526 a sharing interface is displayed to the user. The sharing interface can include a field for adding user names or email addresses to the list of users with which the collaborative content item is to be shared. The sharing interface may also include a text field to allow the sharing user to send a message to users receiving the request to share the collaborative content item.

User Primitives

In some embodiments, the collaborative content management system 130 is configured to recognize particular text patterns as functional primitives that activate various functions of the collaborative content management system 130. One type of functional primitive is a user primitive. A user primitive is indicated by a predetermined token followed by the user name of a user. The user primitive is used in the text or comments of a collaborative content item to programmatically associate a specific user with the collaborative content item or comment. Colloquially, the appearance of a user primitive identifying a user name is called a mention of a user.

In one embodiment, the user primitive takes the form of @username where the "@" symbols is a predetermined token indicates to the collaborative content management system 130 that the following string username is the user name of a system user. Referring to FIG. 5A, several examples of user primitives 520 are illustrated. First in the text of the collaborative content item, the first sentence includes the user primitives "@Bill_Seward" and "@John_Hay. The user primitive "@Bill_Seward" is also shown in the text of comment 504d. The collaborative content management system 130 recognizes these primitives as it processes the text of the collaborative content item and comments.

When a user primitive indicating a specific user appears in the span for a thread, or the text of a comment, the collaborative content management system 130 includes the userID for the indicated user in the audience for thread containing the comment. This allows the mentioned user to see the entire thread in which they are mentioned when accessing the collaborative content item (since access to the thread when opening a collaborative content item is determined by presence of a user's ID in the audience), as well for a mechanism to notify the user, as next described.

In one embodiment, when a user primitive occurs elsewhere in the collaborative content item, but outside of the span for the thread, the userID for the mentioned user is included in the audience. For example, if a user is mentioned in the same paragraph as the span for a thread, the userID for the user is included in the audience.

Contextual Primitives

In addition to user primitives, the collaborative content management system 130 may also support contextual primitives. Contextual primitives function in a similar way to user primitives, however, instead of adding a single user to the audience of a thread, contextual primitives can add a group of users, or user(s) assigned to a specific role (e.g., owner, editor, etc.), to the audience of a thread using document context. A contextual primitive is indicated by a predetermined token followed by a predetermined text string. Each predefined text string may incur different functionality from the collaborative content management system 130. A user inserts the contextual primitive as they are editing the content item.

In some implementations, including the @doc primitive can cause every user with access to the collaborative content item to be included in the audience of a thread that includes the primitive. An algorithm to achieve this functionality is as follows. The collaborative content management system 130 detects the "@doc" text string in the span of a thread or in a comment content and accesses the collaborative content item index of the collaborative content item database 408. The collaborative content management system 130 determines the userIDs with viewing privileges for the collaborative content item according to the collaborative content item index and adds those userIDs to the audience_list for the thread. Alternatively, as discussed below, the system can include an entry in the collaborative content item audience list indicating that multiple users such as all users, authenticated users, users that are part of a particular group, etc., should be included as audience members. When the collaborative content item is subsequently accessed, the thread including the "@doc" primitive will be visible to all users viewing the collaborative content item. Additionally, any notification generating activity in the thread will be reported to all users in the collaborative content item.

In some embodiments, the "@doc" primitive is dynamic such that any users that are added to the collaborative content item even after the thread has been created will be able to view the comment thread. This may be accomplished by reevaluating the span of a thread and the comment text of a thread each time the collaborative content item is compiled. Alternatively, instead of adding userIDs to the audience_list of a thread directly, the collaborative content management system 130 may create a special ID value indicating that the "@doc" primitive has been used. Therefore, during compilation of the collaborative content item, the collaborative content management system 130 checks to see if a particular thread should be displayed to a viewing user by referencing the audience_list of the thread. If the collaborative content management system 130 detects the special ID associated with the "@doc" primitive it will reference the collaborative content item database 408 to determine which users have viewing permissions. If the user ID of the current user is included in the collaborative content item database 408 then the collaborative content management system 130 displays the thread to the current user.

In addition the collaborative content item audience primitive, other contextual primitives may be implemented:

The "@folder" primitive informs the collaborative content management system 130 that all users with access to the folder that includes the collaborative content item should be able to view the thread. In this case, some of the users that have access to the folder may not have access to the collaborative content item. In this case, the collaborative content management system 130 may grant all users with access to the folder access to the collaborative content item, provide a separate interface for users without access to the collaborative content item to view the thread, or it may provide the users without access to the collaborative content item with notifications regarding the thread over email.

The "@editing" primitive indicates that all users with editing access to the collaborative content item are to be included in the audience for a thread. The collaborative content management system 130 parses this in the same way as the "@doc" primitive. However, instead of retrieving all users associated with the collaborative content item in the collaborative content item index only users with editing access are added to the audience_list for the thread. The "@sharing" primitive (only users with sharing privileges are added to the audience_list) functionality is implemented in a similar manner.

The "@threads" primitive adds all users that have participated in threads in the collaborative content item already to the audience_list of the current thread. To accomplish this, upon detecting the "@threads" primitive the collaborative content management system 130 accesses each thread object associated with the collaborativeContentItemID and adds any users listed in the audience list of those threads the audience list of the current thread.

Depending on the embodiment, the specific text string associated with the primitive may be different. A user may also define their own contextual primitive using the client application to select users, categories of users, and contextual categories of users to be included in the primitive. Additionally, and contextual primitive may be made dynamic using a special ID in the audience_list which triggers a reevaluation of the audience list during compilation of the collaborative content item.

File-Level Comment Interfaces

The collaborative content management system 130 also enables file-level commenting and may utilize a number of user interfaces depending on the embodiment. A file-level comment is associated with the file itself and persists with the file until the file is deleted or the comment itself is deleted. This allows for conversations between users to occur on a file-level that persists with each iteration on the file. The methods described herein, also allow for the simultaneous display of the collaborative content item and file-level comments so a user can review the collaborative content item and make comments on the collaborative content item without having to change windows. File-level comments have many of the same characteristics as the content level comments and rely on the same underlying data structure. However, file-level comments are not associated with a span of the collaborative content item and are instead associated with the entirely of the content item. Despite these differences, file-level comments may be used to form threads and have an associated author, creation time and date, which may be displayed in a similar fashion as in content level comments depending on the embodiment.

Because file-level comments are not associated with a particular span of the collaborative content item, different UI elements may be used to display the file-level comments. FIG. 5B illustrates an embodiment for creating and displaying file-level comments.

FIG. 5B shows an example user interface with a file-level comment associated with the title of the collaborative content item. FIG. 5B displays the same six comments and four threads as in FIG. 5A, with the addition of a file-level comment 528. The file-level comment is displayed alongside the content level comments in the comment pane 512. Instead of being for a particular span in the collaborative content item, as with the content level comments, the file-level comment 528 is associated with the entire document, and is indicated in the collaborative content item by visually distinguishing features 531, such as formatting or highlighting, borders or the like to the title of the collaborative content item 530. Optionally, the same visually distinguishing features can be applied to the comment itself, so that the user knows that which comments are associated with the file and which with specific spans of the content item. FIG. 5B also illustrates the use of a file-level primitive 532, "@file", to indicate that a comment is file-level comment rather than a content level comment.

Proxy Server and Rate Limiting Server Environment

Figure 6:
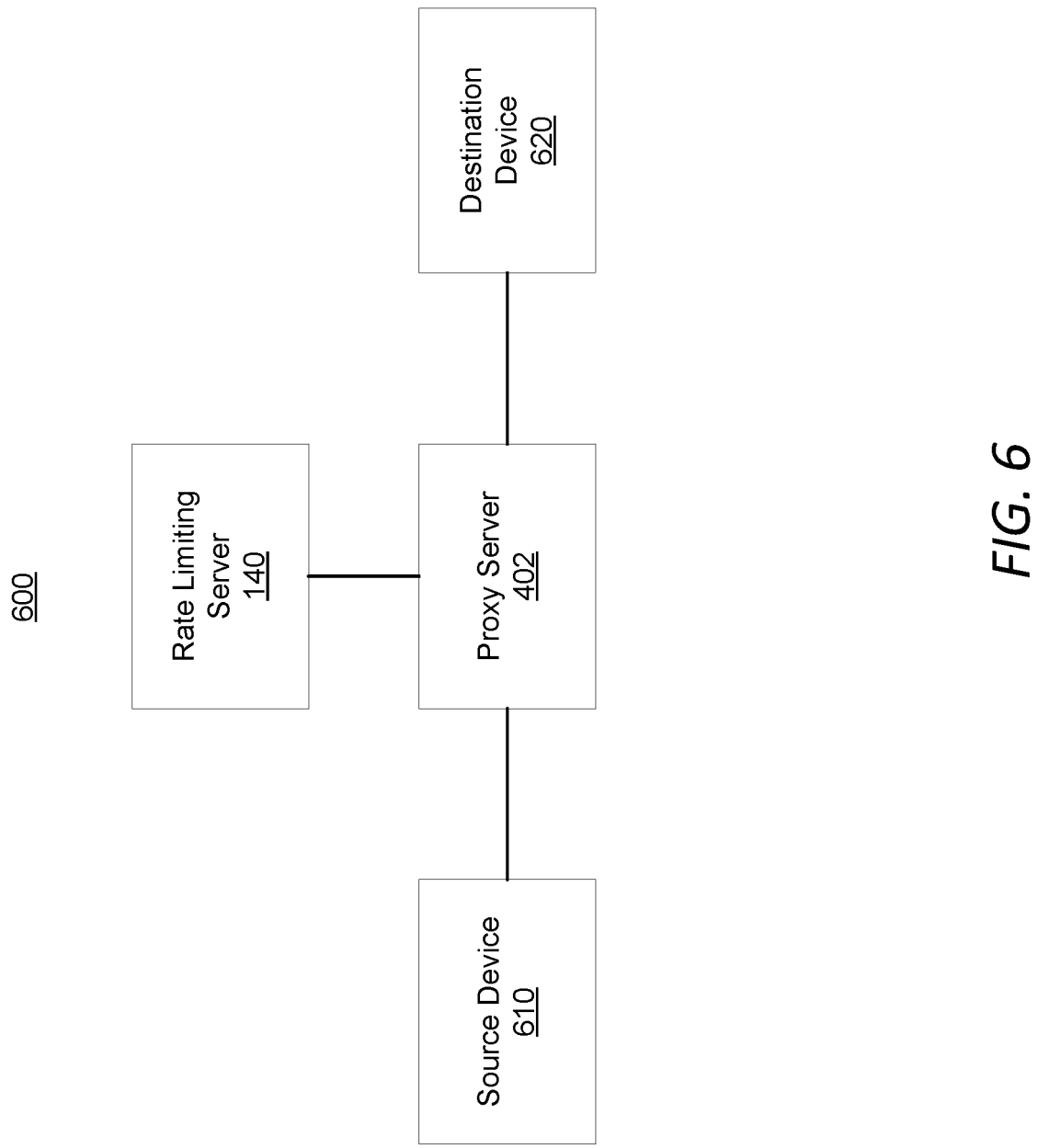
FIG. 6 shows a system environment of a proxy server and rate limiting server, according to one example embodiment.

FIG. 6 shows a system environment of a proxy server and rate limiting server, according to one example embodiment. FIG. 6 illustrates system 600 including rate limiting server 140, source device 610, destination device 620, and proxy server 402, where proxy server 402 is the client of rate limiting server 140. In some embodiments, system 600 may include multiple proxy servers, each with its own cache. A source device serves as the source of the communication. The source device may be client device 120, content management system 100, or collaborative content management system 130. A destination device serves as the destination of the communication (e.g., as indicated in a header and/or payload of the communication), and as such, may contain modules able to process the communication or the request included within the communication. The destination device may be client device 120, a different client device, content management system 100, or collaborative content management system 130. Proxy server 402 receives a communication from source device 610 and passes the communication to rate limiting server 140. Proxy server 402 determines the state of rate limiting. Responsive to determining that the state of rate limiting for the path of the communication is strict, proxy server 402 may wait for a response from rate limiting server 140 that indicates whether the communication is rate limited or not rate limited. Responsive to determining that the state of rate limiting for the path of the communication is permissive, proxy server 402 may pass the communication directly to destination device 620, bypassing waiting for the response from rate limiting server 140. Further details of this process are described below (e.g., with respect to FIG. 10).

Proxy Server Particulars

Figure 7:
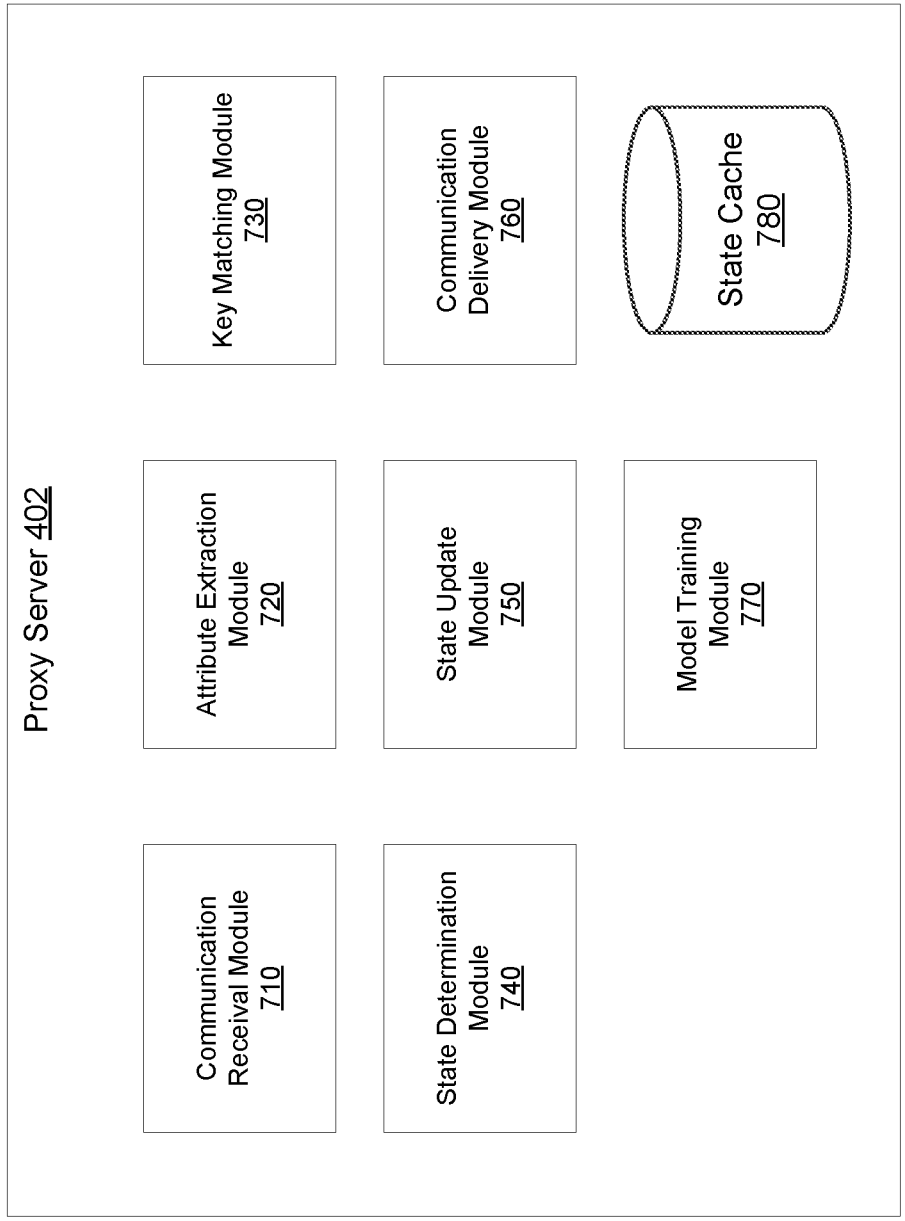
FIG. 7 shows a block diagram of a proxy server, according to one example embodiment.

FIG. 7 shows a block diagram of a proxy server, according to one example embodiment. Proxy server 402 includes communication receival module 710, attribute extraction module 720, key matching module 730, state determination module 740, state update module 750, communication delivery module 760, model training module 770, and state cache 780. The modules and databases depicted in FIG. 7 are merely exemplary; more or fewer modules and/or databases may be used by proxy server 402 to achieve the functionality described herein. Moreover, these modules and/or databases may be located in a single server, or may be distributed across multiple servers.

Communication receival module 710 receives a communication from a source device (e.g., source device 610) that is destined to a destination device (e.g., destination device 620). A communication may include a request; for example, a request to access content stored in content storage 318 of content management system 100, or a request to edit content using collaborative content items editor 270. The request may be in the form of an API request and include information such as a route-endpoint, a path, and query parameters in the form of key-value pairs. The communication may include metadata, such as the source server, source IP, destination server, destination IP, or destination route. These request illustrations are merely exemplary; any communication from source to destination may be processed by communication receival module 710, with or without a request of any type.

Attribute extraction module 720 determines and extracts one or more attributes associated with the communication. Attributes may include data or metadata associated with the communication. Exemplary attributes may include one or more of the source server, source IP, destination server, destination IP, destination route, and the like. The path of the communication or components of the path of the communication may be attributes. Attribute extraction module 720 extracts the attributes by parsing through the data provided by the communication. For example, if the communication contains an API request made up of key-value pairs, attribute extraction module 720 may parse through the key-value pairs and extract one or more of the values as attributes of the communication. In another example, if the communication's path includes a source server and destination server, attribute extraction module 720 may extract the source and destination servers as attributes.

Key matching module 730 matches the communication with a cache key based on attributes of the communication extracted by attribute extraction module 720, where attributes may include the path of the communication or components thereof. A cache key is an identifier that connects communications that share particular attributes with a state of rate limiting. For example, key matching module 730 may match communications with same source server to a particular cache key, thus matching the communications to the same state of rate limiting. In another example, key matching module 730 may match communications with the exact same path to the same cache key. Key matching module 730 may match the communication to a cache key based on the absence of one or more attributes of the communication. For example, key matching module 730 may match communications that do not have destination server A as the destination with a particular cache key. In some embodiments, rate limiting server 140 may provide the cache key that matches the communication (e.g., in response to detecting the communication).

State determination module 740 determines a state of rate limiting corresponding to the communication, based on the state that corresponds to the identified cache key. A set of possible states may include a permissive state, where rate limiting is not in place, and a strict state, where rate limiting is approaching or where rate limiting is in place. Examples of situations involving each state are illustrated in FIG. 8. State determination module 740 may determine the state corresponding to the identified cache key by accessing a state corresponding to the identified cache key stored in state cache 780, located on proxy server 402. In some embodiments, state cache 780 may store the state of rate limiting when it is either permissive or strict. In an alternative embodiment, state cache 780 may only store the state of rate limiting when it is strict. In the embodiment where state cache 780 only stores the state of rate limiting when it is strict, if state determination module 740 finds no state stored in state cache 780, state determination module 740 determines that the state is permissive.

State update module 750 updates the state of rate limiting corresponding to the cache key. State update module 750 receives the state of rate limiting by querying rate limiting server 140 and waiting for a response indicating that the communication is rate limited (state of rate limiting is strict), approaching rate limiting (state of rate limiting is strict), or not rate limited (state of rate limiting is permissive). While waiting for a response from the rate limiting server, proxy server 402 may continue to process communications with the state of rate limiting being the state of rate limiting previously determined by state determination module 740. In some embodiments, state update model 750 receives the state of rate limiting through a broadcast from rate limiting server 140, wherein the broadcast includes the state. Responsive to determining that the received state of rate limiting is the same as the state determined by state determination module 740, the state update module 750 does not update the state. Responsive to determining that the received state is different from the state determined by state determination module 740, state update module 750 updates state cache 780 to reflect the received state. In one embodiment, updating state cache 780 includes replacing the state in state cache 780 to be the received state, either permissive or strict. In an alternative embodiment, updating state cache 780 includes removing the state stored in state cache 780 responsive to the received state being permissive or adding a strict state to the state cache 780 responsive to the received state being strict.

Communication delivery module 760, in response to the state determined by state determination module 740, either transmits the communication to the destination device or transmits a notification to the source device that the communication is rate limited. Responsive to determining that the state of rate limiting is permissive, communication delivery module 760 transmits the communication to the destination device. Responsive to determining that the state of rate limiting is strict, communication delivery module 760 queries rate limiting server 140 and waits for a response indicating whether communication delivery module 760 should transmit the communication to the destination device or transmit a notification to the source device and discard of the communication.

Model training module 770 trains a machine learning model to receive one or more attributes of a communication as input and output one of the states: permissive or strict. Model training module 770 trains the model using historical data comprising communications labelled by the state of rate limiting determined by rate limiting server 140. Namely, "permissive" if the state of rate limiting is rate limiting not in place and "strict" if the state of rate limiting is rate limiting approaching or rate limiting in place. Model training module 770 may train a plurality of models each tuned to a different context and may use training examples that correspond to each particular context. For example, model training module 770 may train a first model to predict the rate limiting state for communications in a first geographic region and train a second model to predict the rate limiting state for communications in a second geographic region. Other examples of different contexts model training module 770 may train models for include particular types of communications, communications in extreme situations (e.g., a situation where a ticketing website releases tickets for an event, and the website receives a sudden uptick in requests to be accessed), or communications received during changes to system structure (e.g., server migration or change in the amount of servers). Model training module 770 may continually retrain models as new communications are received. For example, as a new situation arises that imposes a strain on the network, model training module 770 may incorporate the communications and rate limiting parameters involved in the situation. For a given path, responsive to model training module 770 predicting a strict state where rate limiting server 140 predicts a permissive state for a threshold amount of time, proxy server 402 may provision more resources (i.e., servers) to handle communications with that path or may signal to an administrator or manager to do so.

Rate Limiting Example

FIG. 8 shows the state of rate limiting for various example rate limiting scenarios, according to one example embodiment. FIG. 8 depicts plot 800 showing the number of requests 805 received over time 860 by a rate limiting server for a given path, where each request 850 is represented as a box. Rate limit 810 is set to five requests per minute and is represented as a dashed horizontal line. Requests 850 that lie below the dashed line are accepted requests 830 and requests 850 that lie above the dashed line are denied requests 840. Accepted requests 830 are requests that the rate limiting server directs its client to fulfill (i.e., to pass to the destination server), while denied requests 840 are requests that the rate limiting server directs its client to not fulfill (i.e., to not pass to the destination server). State of rate limiting 820 shows the state of rate limiting in place at each minute, as the rate limiting server receives a new set of requests 850.

When the time 860 is 12:00, the rate limiting server receives (e.g., from a proxy server) two requests 850 corresponding to a given path. Since the rate limiting server received two requests in the first minute, the rate is at two requests per minute, which is lower than rate limit 810 of five requests per minute. Thus, both requests 850 are accepted requests 830 and state of rate limiting 820 is: permissive.

When the time 860 is 12:01, the rate limiting server receives (e.g., from a proxy server) four requests 850 corresponding to given path. Since the rate limiting server received four requests in a minute, the rate is at four requests per minute, which is lower than rate limit 810 of five requests per minute but is approaching rate limit 810. Thus, requests 850 are accepted requests 830 and state of rate limiting 820 is: strict.

When the time 860 is 12:02, the rate limiting server receives (e.g., from a proxy server) six requests 850 corresponding to the given path. Since the rate limiting server received six requests in a minute, the rate is at six requests per minute, which is higher than rate limit 810 of five requests per minute. Thus, only five requests 850 are accepted requests 850 and one request is a denied request 840. The state of rate limiting 820 is: strict.

Permissive State

FIG. 9A shows an interaction diagram between a source device, rate limiting server, proxy server, and destination device when the state is permissive, according to one example embodiment. In particular, FIG. 9A shows an interaction diagram between source device 610, rate limiting server 140, proxy server 402, and destination device 620 when the state of rate limiting is permissive, according to one example embodiment. Process 900a begins when source device 610 transmits 910a the communication to proxy server 402. Responsive to receiving the communication, proxy server 402 determines 915a the state of rate limiting. Responsive to determining that the state of rate limiting is permissive, proxy server 402 may query 920a the rate limiting server, yet because the state is permissive, proxy server 402 does not hold the communication and instead transmits 940a the communication to the destination device. After latency 950a, rate limiting server 140 may respond 930a to proxy server 402.

Strict State

Figure 9B:
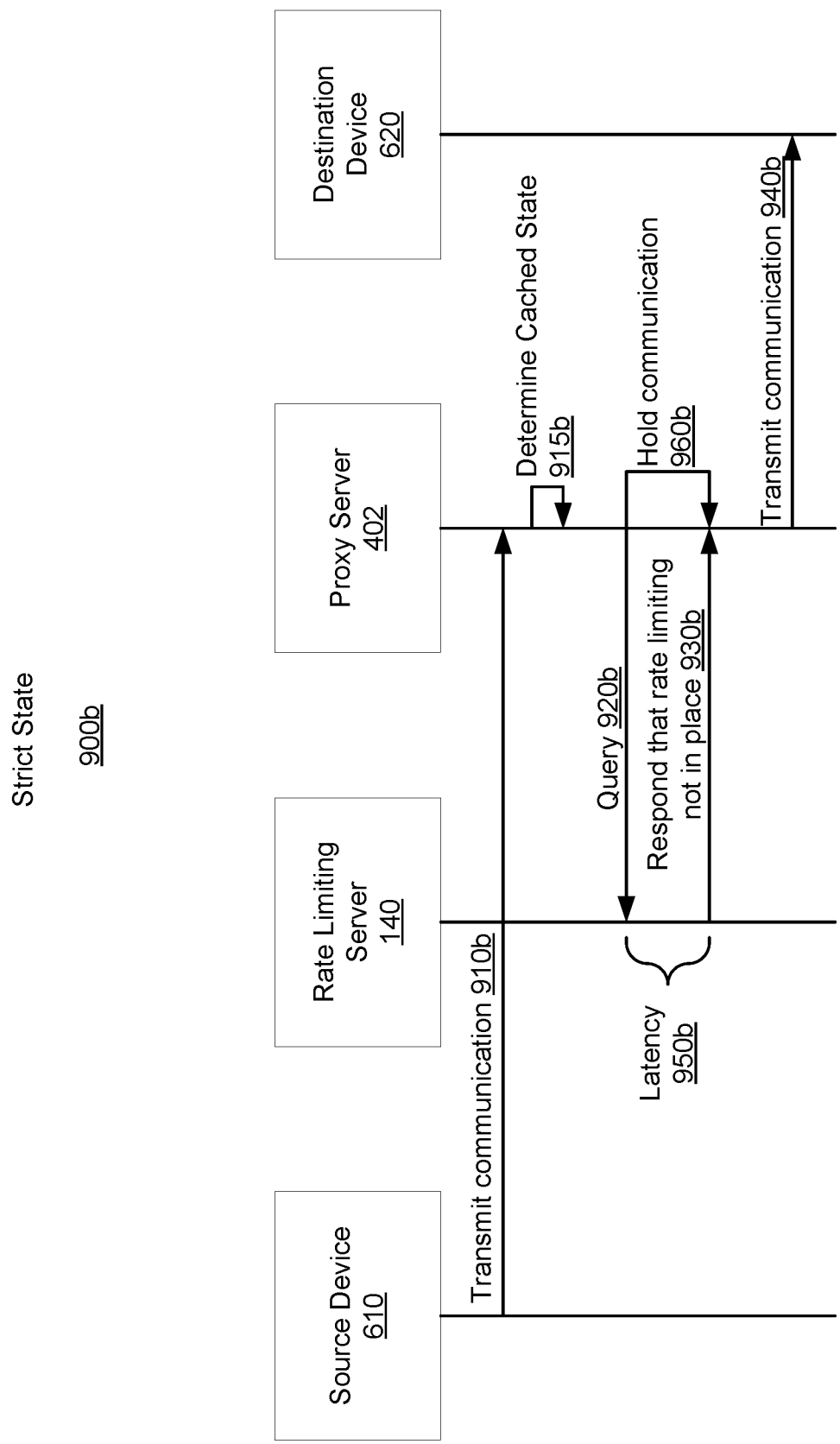
FIGS. 9B-C show interaction diagrams between a source device, rate limiting server, proxy server, and destination device when the state is strict, according to one example embodiment.
Figure 9C:
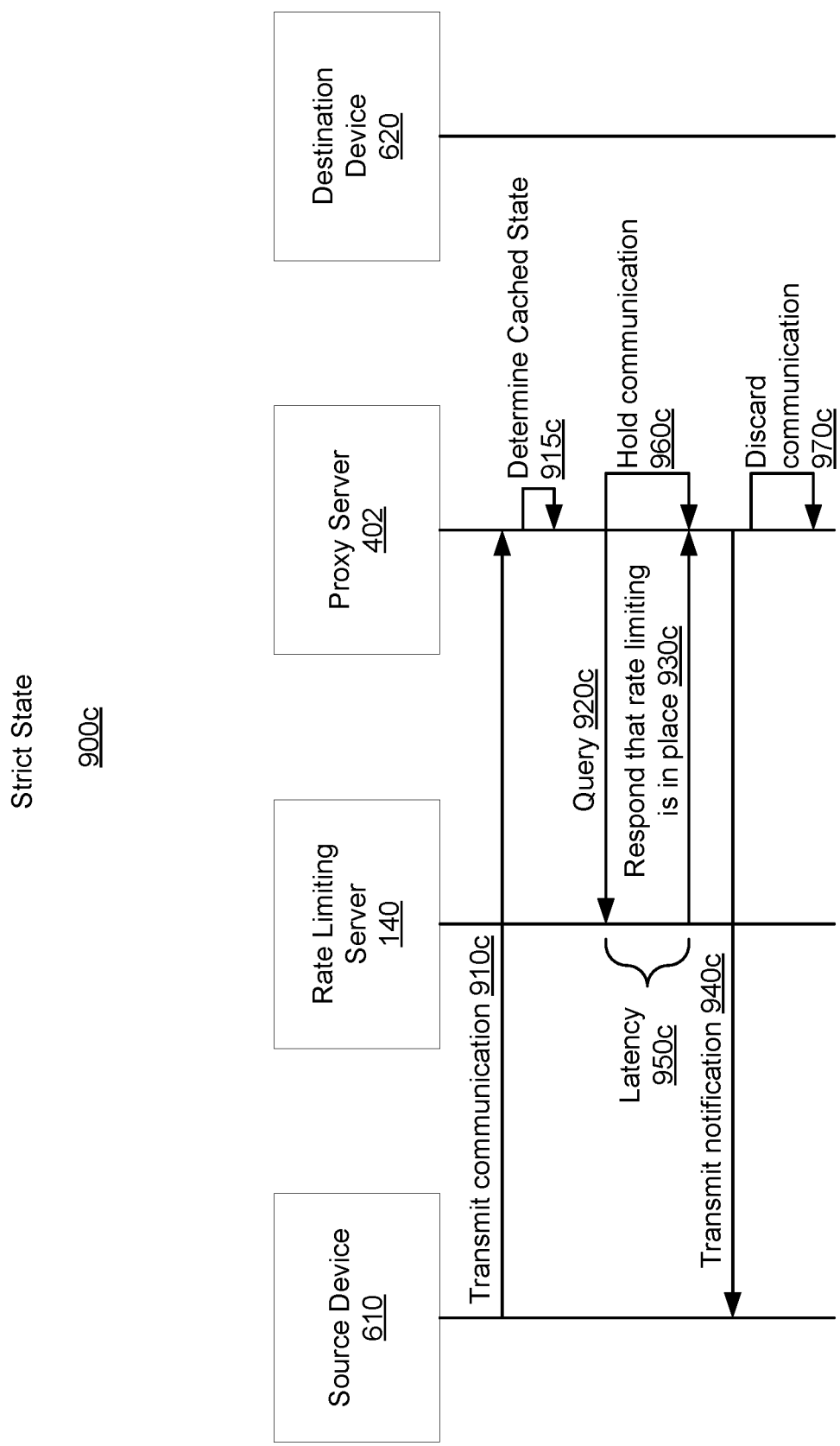

FIGS. 9B-C show interaction diagrams between a source device, rate limiting server, proxy server, and destination device when the state is strict, according to one example embodiment. In particular, FIG. 9B-C show interaction diagrams between source device 610, rate limiting server 140, proxy server 402, and destination device 620 when the state is strict, according to one example embodiment. Processes 900b and 900c both begin when source device 610 transmits 910b/910c the communication to proxy server 402. Responsive to receiving the communication, proxy server 402 determines 915b/915c the state of rate limiting. Responsive to determining that the state of rate limiting is strict, proxy server 402 queries 920b/920c the rate limiting server 140. Because the state is strict, proxy server 402 holds 960b/960c the communication until rate limiting server 140 responds 930b/930c, which happens after latency 950b/950c. In FIG. 9B, the response indicates that rate limiting is not in place. In response to rate limiting server 140 responding 930b that rate limiting is not in place, proxy server 402 transmits 940b the communication to the destination device. In FIG. 9C, the response indicates that rate limiting is in place. In response to rate limiting server 140 responding 930c that rate limiting is in place, proxy server 402 transmits 940c a notification to the source device, indicating that the communication has not been sent to destination device 620. Proxy server 402 may discard the communication 970c.

Communication Management Process

Figure 10:
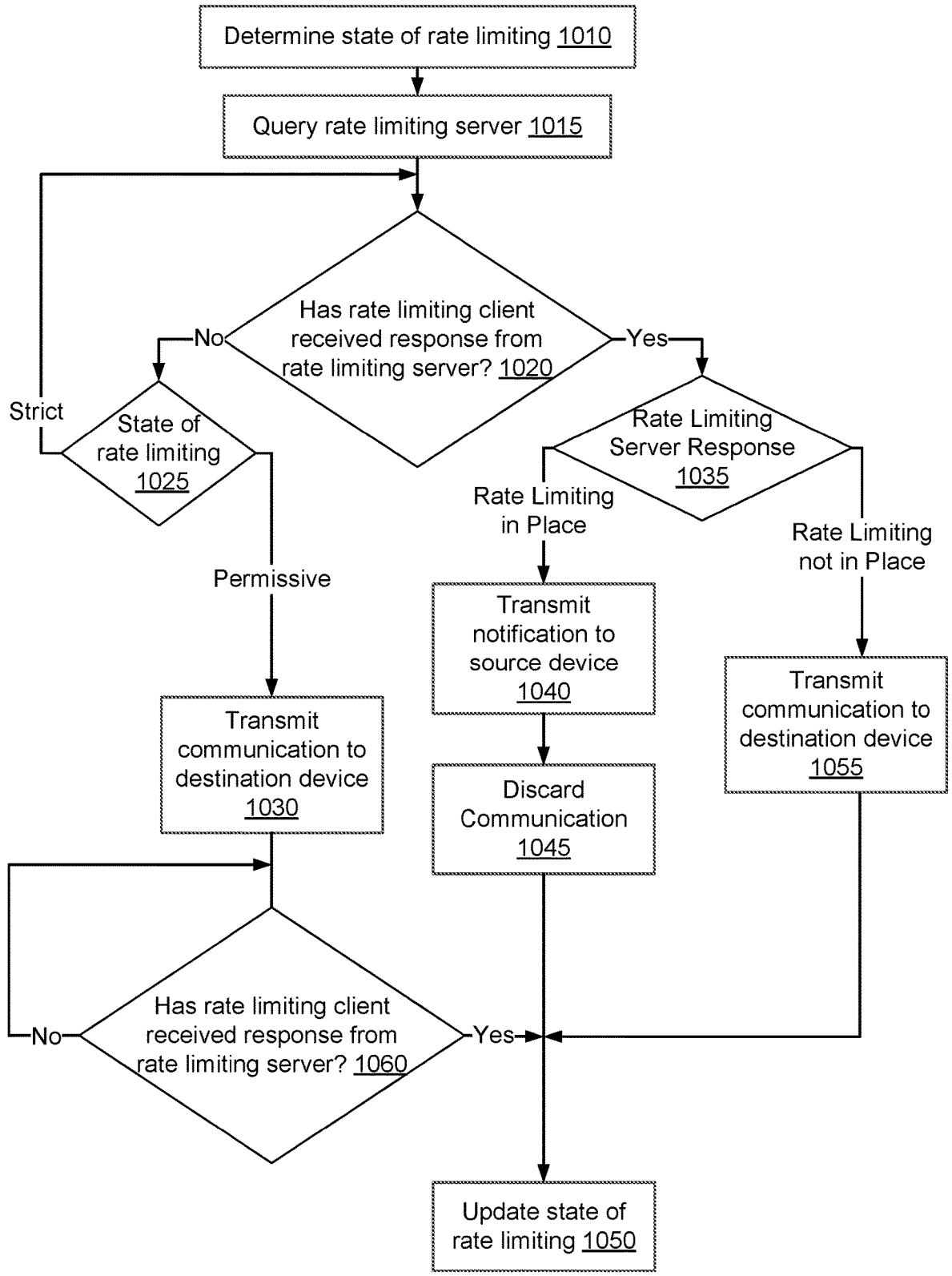
FIG. 10 shows a flowchart of a process for using a state of rate limiting on a proxy server to manage communications from source to destination, according to one example embodiment.

FIG. 10 shows a flowchart of an exemplary process for using a state of rate limiting on a proxy server to manage a received communication. Process 1000 is triggered in response to the proxy server receiving a communication from a source device destined to a destination device (e.g., using communication receival module 710). Process 1000 begins with the proxy server determining 1010 a state of rate limiting corresponding to the communication (e.g., using attribute extraction module 720 to extract attributes of the communication, using key matching module 730 to identify a cache key corresponding to the communication, and using state determination module 740). The proxy server queries 1015 the rate limiting server (e.g., using state update module 750).

The proxy server checks for if it has received 1020 a response from the rate limiting server. Responsive to the proxy server not receiving a response from the rate limiting server, the proxy server checks the state of rate limiting 1025 determined in step 1010. Responsive to determining that the state of rate limiting 1025 is strict, process 1000 returns to step 1020 (essentially to wait for a response from the rate limiting server). Responsive to determining that the state of rate limiting is permissive, the proxy server transmits 1030 the communication to the destination device (e.g., using communication delivery module 760). The proxy server may update 1050 the state of rate limiting responsive to receiving 1060 a response from the rate limiting server.

Returning to step 1020, responsive to the proxy server receiving 1020 a response from the rate limiting server, the proxy server checks the rate limiting server response 1035. Responsive to determining that the rate limiting server response is that rate limiting is in place, the proxy server transmits 1040 a notification to the source device and discards 1045 the notification (e.g., using communication delivery module 760). Responsive to determining that the rate limiting server response is that rate limiting is not in place, the proxy server transmits 1055 the communication to the destination device (e.g., using communication delivery module 760). The proxy server updates 1050 the state of rate limiting (e.g., using state update module 1050).

File System Example

Figure 11:
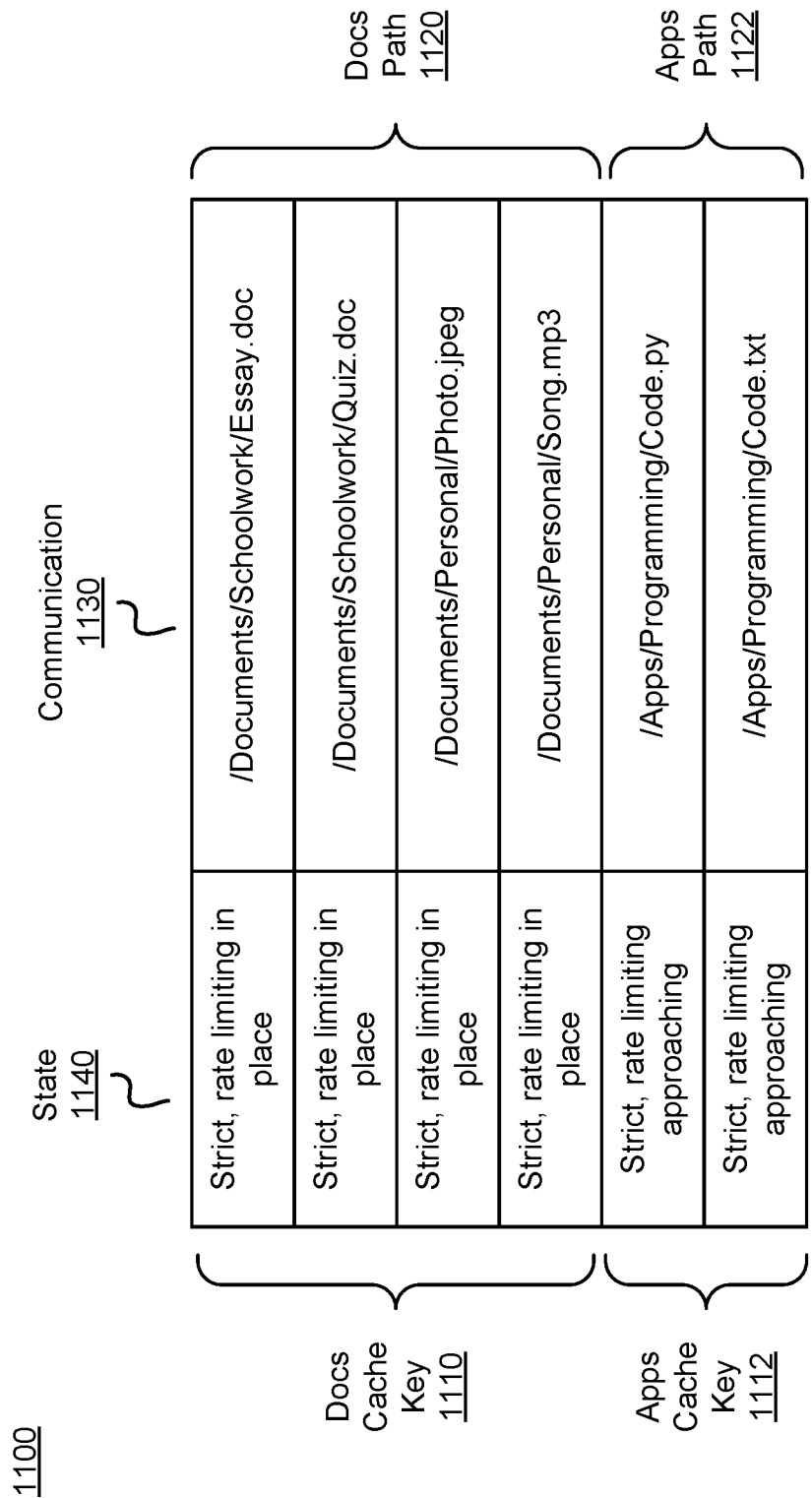
FIG. 11 shows a file system comprising a set communications with file paths and corresponding cache keys, according to one example embodiment.

FIG. 11 shows an example cache comprising a set of communications with file paths and corresponding cache keys, according to one embodiment. File system 1100 comprises a set of communications 1130 with file paths decomposed into two subsets: docs path 1120 and apps path 1122. Four file paths are labelled as docs path 1120 as their corresponding communications all contain a "Documents" folder in their file paths (e.g., "/Documents/Schoolwork/Essay.doc"). Two file paths are labelled as apps path 1122 as their corresponding communications all contain an "Apps" folder in their file paths (e.g., "/Apps/Programming/Code.py"). In file system 1100, each of the file path subsets correspond to a cache key. Docs cache key 1110 is a cache key corresponding to communications 1130 with docs path 1120. Apps cache key 1112 similarly corresponds to communications 1130 with apps path 1122. For purposes of the simplifying the example, cache keys correspond to communications with the first folder in their file path in common (e.g., "/Documents/Schoolwork/Quiz.doc" and "/Documents/Personal/Photo.jpeg" are both communications with "Documents" as the first folder in the file path). In some embodiments, cache keys may correspond to communications based on one or more attributes of the communications (which may or may not include the first folder in the file path, as shown in this example). Each communication 1130 has a state of rate limiting, state 1140. Note that, in the example embodiment, the cache does not hold communications in the permissive state, rather it only holds communications in the strict state. In an embodiment, the cache may hold communications in the permissive state and communications in the strict state. In this example, the strict states are decomposed into two subsets: "strict, rate limiting approaching" and "strict, rate limiting in place." State 1140 for each communication 1130 depends on the communication's corresponding cache key. In this example, state 1140 for communications 1130 corresponding to docs cache key 1110 is "strict, rate limiting in place," and state 1140 for communications 1130 corresponding to apps cache key 1112 is "strict, rate limiting approaching."

Additional Considerations

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. It will be understood that any computer programming language may support equivalent structures using a different terminology than "module."

It will be understood that the named modules described herein represent one embodiment of such modules, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, read-only memories (ROMs), random access memories (RAMs), magnetic or optical cards, or any type of media suitable for storing electronic instructions, and each coupled to a computer system bus. Furthermore, the computers referred to in the specification may include a single processor or may be architectures employing multiple processor designs for increased computing capability.

The algorithms presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

As used herein, the word "or" refers to any possible permutation of a set of items. Moreover, claim language reciting 'at least one of' an element or another element refers to any possible permutation of the set of elements.

Although this description includes a variety of examples and other information to explain aspects within the scope of the appended claims, no limitation of the claims should be implied based on particular features or arrangements these examples. This disclosure includes specific embodiments and implementations for illustration, but various modifications can be made without deviating from the scope of the embodiments and implementations. For example, functionality can be distributed differently or performed in components other than those identified herein. This disclosure includes the described features as non-exclusive examples of systems components, physical and logical structures, and methods within its scope.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method comprising:
receiving, at a rate limiting client, a communication from a source device that is destined to a destination device;
determining, at the rate limiting client and in response to receiving the communication, a state of rate limiting for a path of the communication;
in response to receiving the communication, transmitting, from the rate limiting client to a rate limiting server, a query as to whether to update the state of rate limiting;
in response to the rate limiting client determining that the state of rate limiting is a permissive state, transmitting the communication to the destination device without waiting for a response from the rate limiting server to the query as to whether to update the state of rate limiting; and
in response to the rate limiting client determining that the state of rate limiting is a strict state, holding the communication at the rate limiting client and waiting for the response from the rate limiting server before determining whether to transmit the communication to the destination device.

2. The method of claim 1, further comprising,
in response to the rate limiting client determining that the state of rate limiting is the strict state determining whether the response from the rate limiting server indicates that the communication is rate limited or the response from the rate limiting server indicates that the communication remains below a rate limit.

3. The method of claim 2, further comprising, in response to determining that the response from the rate limiting server indicates that the communication is rate limited:
transmitting a notification to the source device that the communication is rate limited; and
discarding the communication.

4. The method of claim 2, further comprising, in response to determining that the response from the rate limiting server indicates that the communication remains below the rate limit, transmitting the communication to the destination device.

5. The method of claim 1, wherein determining the state of rate limiting comprises:
determining a plurality of attributes of the communication;
identifying a cache key corresponding to the plurality of attributes, the cache key identified from a plurality of cache keys; and
determining the state of rate limiting from the cache key.

6. The method of claim 5, further comprising:
receiving, from the rate limiting server, a broadcast key update; and
responsive to receiving the broadcast key update, updating the state of rate limiting for each of the plurality of cache keys.

7. The method of claim 1, further comprising updating the state of rate limiting based on the response from the rate limiting server.

8. The method of claim 1, further comprising:
determining a state of rate limiting for the communication by:
determining attributes associated with the path of the communication;
inputting the attributes into a supervised machine learning model; and
receiving, as output from the supervised machine learning model, the state of rate limiting.

9. The method of claim 1, wherein determining the state of rate limiting comprises:

receiving, from the rate limiting server, a broadcast key update; and responsive to receiving the broadcast key update, updating the state of rate limiting for each of a plurality of cache keys referenced in the broadcast key update.

10. A non-transitory computer-readable medium comprising memory with instructions encoded thereon, the instructions, when executed by one or more processors, causing the one or more processors to perform operations, the instructions comprising instructions to:

receive, at a rate limiting client, a communication from a source device that is destined to a destination device;

determine, at the rate limiting client and in response to receiving the communication, a state of rate limiting for a path of the communication;

in response to receiving the communication, transmit, from the rate limiting client to a rate limiting server, a query as to whether to update the state of rate limiting;

in response to the rate limiting client determining that the state of rate limiting is a permissive state, transmit the communication to the destination device without waiting for a response from the rate limiting server to the query as to whether to update the state of rate limiting; and in response to the rate limiting client determining that the state of rate limiting is a strict state, hold the communication at the rate limiting client and wait for the response from the rate limiting server before determining whether to transmit the communication to the destination device.

11. The non-transitory computer-readable medium of claim 10, wherein the instructions further comprise to:

in response to the rate limiting client determining that the state of rate limiting is strict, determine whether the response from the rate limiting server indicates that the communication is rate limited or the response from the rate limiting server indicates that the communication remains below a rate limit.

12. The non-transitory computer-readable medium of claim 11, wherein the instructions further comprise instructions to:

in response to determining that the response from the rate limiting server indicates that the communication is rate limited:

transmit a notification to the source device that the communication is rate limited; and discard the communication.

13. The non-transitory computer-readable medium of claim 11, wherein the instructions further comprise instructions to:

in response to determining that the response from the rate limiting server indicates that the communication remains below the rate limit, transmit the communication to the destination device.

14. The non-transitory computer-readable medium of claim 10, wherein the instructions for determining the state of rate limiting of the rate limiting server comprise instructions to:

determine a plurality of attributes of the communication;
identify a cache key corresponding to the plurality of attributes, the cache key identified from a plurality of cache keys; and
determine the state of rate limiting from the cache key.

15. The non-transitory computer-readable medium of claim 14, wherein the instructions further comprise instructions to:

receive, from the rate limiting server, a broadcast key update; and responsive to receiving the broadcast key update, update the state of rate limiting for each of the plurality of cache keys.

16. The non-transitory computer-readable medium of claim 10, further comprising updating the state of rate limiting based on the response from the rate limiting server.

17. The non-transitory computer-readable medium of claim 10, wherein the instructions further comprise instructions to:

determine a state of rate limiting state for the communication by:

determining attributes associated with the path of the communication;

inputting the attributes into a supervised machine learning model; and receiving, as output from the supervised machine learning model, the state of rate limiting.

18. The non-transitory computer-readable medium of claim 10, wherein the instructions for determining the state of rate limiting comprise instructions to:

receive, from the rate limiting server, a broadcast key update; and responsive to receiving the broadcast key update, update the state of rate limiting for each of a plurality of cache keys referenced in the broadcast key update.

19. A system comprising:

memory with instructions encoded thereon; and one or more processors that, when executing the instructions, are caused to perform operations comprising:

receiving, at a rate limiting client, a communication from a source device that is destined to a destination device;

determining, at the rate limiting client and in response to receiving the communication, a state of rate limiting for a path of the communication;

in response to receiving the communication, transmitting, from the rate limiting client to a rate limiting server, a query as to whether to update the state of rate limiting;

in response to the rate limiting client determining that the state of rate limiting is a permissive state, transmitting the communication to the destination device without waiting for a response from the rate limiting server to the query as to whether to update the state of rate limiting; and in response to the rate limiting client determining that the state of rate limiting is a strict state, holding the communication at the rate limiting client and waiting for the response from the rate limiting server before determining whether to transmit the communication to the destination device.

20. The system of claim 19, the operations further comprising:

in response to the rate limiting client determining that the state of rate limiting is the strict state determining whether the response of the rate limiting server indicates that the communication is rate limited or the response from the rate limiting server indicates that the communication remains below a rate limit.

* * * * *